(12) United States Patent
Brand

(10) Patent No.: US 8,862,359 B2
(45) Date of Patent: Oct. 14, 2014

(54) HYDROSTATIC DRIVE SYSTEM

(75) Inventor: Michael Brand, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 13/699,348

(22) PCT Filed: May 25, 2011

(86) PCT No.: PCT/EP2011/002579
§ 371 (c)(1),
(2), (4) Date: Feb. 6, 2013

(87) PCT Pub. No.: WO2011/147562
PCT Pub. Date: Dec. 1, 2011

(65) Prior Publication Data
US 2013/0197772 A1 Aug. 1, 2013

(30) Foreign Application Priority Data

May 26, 2010 (DE) .......................... 10 2010 021 624

(51) Int. Cl.
*B60K 17/356* (2006.01)
*B60K 28/16* (2006.01)
*B60K 23/08* (2006.01)

(52) U.S. Cl.
CPC ................. *B60K 28/16* (2013.01); *B60K 23/08* (2013.01); *B60W 2520/26* (2013.01); *B60K 17/356* (2013.01)
USPC .................. 701/82; 701/89; 701/50; 180/242

(58) Field of Classification Search
None
See application file for complete search history.

(56) References Cited

U.S. PATENT DOCUMENTS

| | | | |
|---|---|---|---|
| 4,667,763 A * | 5/1987 | Nembach | 180/243 |
| 5,775,453 A * | 7/1998 | Williams et al. | 180/197 |
| 7,240,489 B2 * | 7/2007 | Hofer | 60/490 |
| 2008/0280719 A1 * | 11/2008 | Heindl | 475/205 |

FOREIGN PATENT DOCUMENTS

| | | |
|---|---|---|
| DE | 42 11 323 A1 | 10/1993 |
| DE | 43 96 170 T1 | 10/1995 |
| DE | 10 2005 060 340 A1 | 6/2007 |
| DE | 10 2007 018 449 A1 | 10/2008 |
| EP | 0 224 144 A1 | 6/1987 |
| EP | 1 580 058 A2 | 9/2005 |

(Continued)

OTHER PUBLICATIONS

International Search Report corresponding to PCT Application No. PCT/EP2011/002579, mailed Nov. 21, 2011 (German and English language document) (7 pages).

*Primary Examiner* — Michael J Zanelli
(74) *Attorney, Agent, or Firm* — Maginot, Moore & Beck

(57) ABSTRACT

A hydrostatic drive system includes an anti-slip control unit having a hydraulic pump which supplies a plurality of hydraulic motors of a plurality of axles with pressure medium. Based on a detected slip, a control device switches over between a two-wheel and a multiple-wheel drive and controls the driving torque. Optimal distribution of driving torque and traction between the axles or wheels of the drive system is set in the drive system. A method for anti-slip control of a hydrostatic drive system includes reacting to a slip situation by activating a hydraulic motor for axles or wheels which until then were not driven, or driven only with low driving torque or by increasing the driving torque of wheels which until then did not slip. The capacity of the hydraulic motor of the axles or wheels is raised to enable the activation/increase.

14 Claims, 1 Drawing Sheet

(56) References Cited

FOREIGN PATENT DOCUMENTS

| | | | |
|---|---|---|---|
| EP | 1 582 389 | A2 | 10/2005 |
| EP | 1 950 468 | A1 | 7/2008 |
| FR | 2 251 453 | | 6/1975 |
| WO | 92/10382 | A1 | 6/1992 |

* cited by examiner

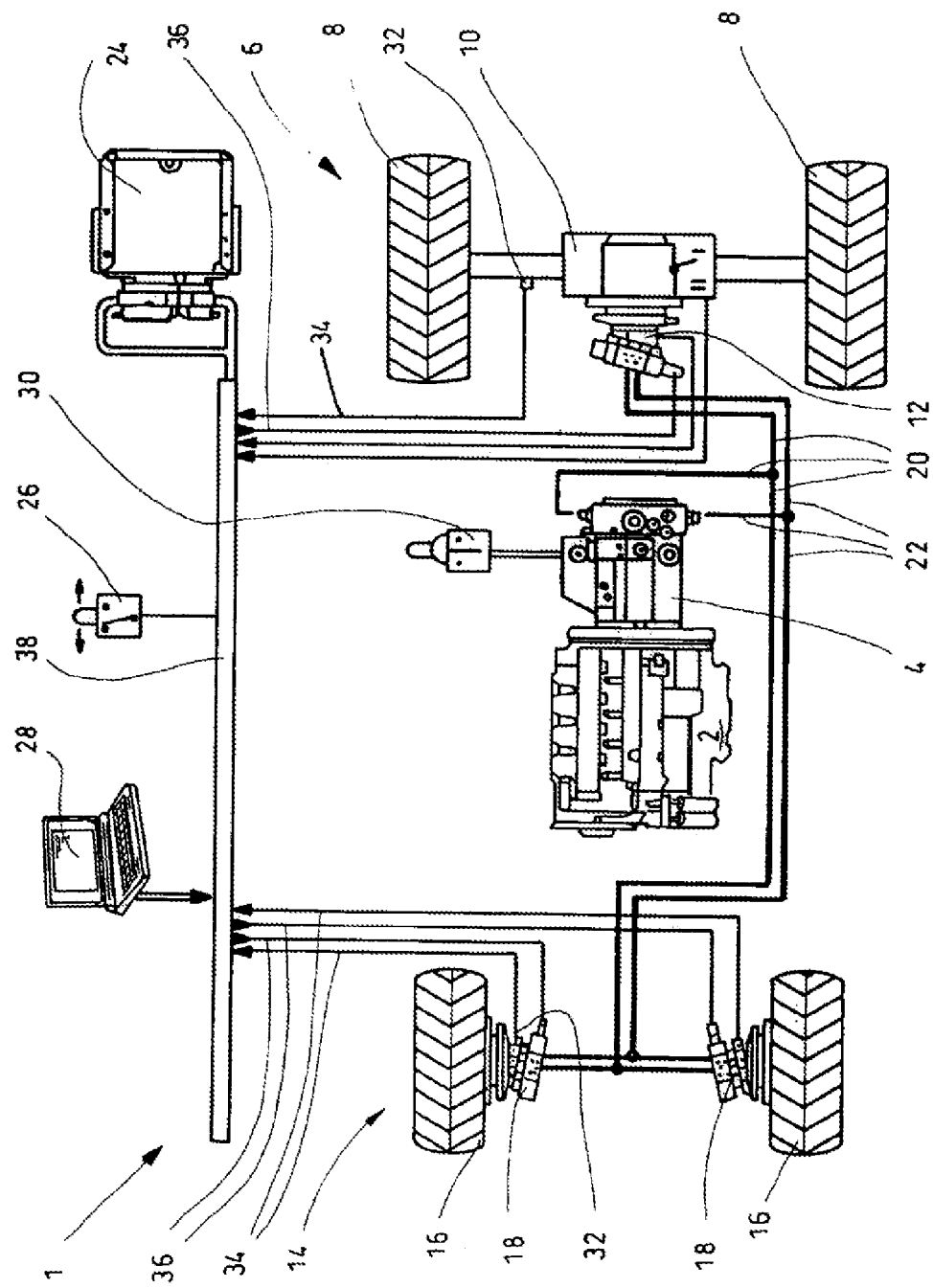

HYDROSTATIC DRIVE SYSTEM

This application is a 35 U.S.C. §371 National Stage Application of PCT/EP2011/002579, filed on May 25, 2011, which claims the benefit of priority to Serial No. DE 10 2010 021 624.0, filed on May 26, 2010 in Germany, the disclosures of which are incorporated herein by reference in their entirety.

The disclosure relates to a hydrostatic drive system according to the description below and a method for the anti-slip regulation of a hydrostatic drive system according to the description below.

BACKGROUND

Hydrostatic drive systems are used in particular in fields in which heavy vehicles have to be moved with a high level of precision on challenging surfaces. In principle, a driving power of a diesel engine operating predominantly at constant rotational speed is transferred during this process to axle units via an adjustable hydraulic transmission or directly to individual wheels of the axle units. Such drive systems are used in particular in agricultural machinery or in construction machinery. Due to the often unfavorable ground conditions in these fields of application, a key task of the drive system is to drive the wheels with optimal traction and minimal slip.

In such drive systems, only the wheels of a first axle unit, in particular the front axle unit, are often driven. The wheels of another axle unit, for example the rear axle unit, run concurrently in an undriven manner and are often steerable. The axle units or the individual wheels are driven via adjustable or unadjustable or constant hydraulic motors. The hydraulic motors are supplied with pressure medium via at least one hydraulic pump, which is generally driven by the motor of the drive system.

An approach known from the prior art for maximizing the traction of the drive system is, in essence, the use of a four-wheel or all-wheel drive. In addition, the prior art discloses an anti-slip regulation (ASR) for minimizing slip.

DE 10 2005 060 340 A1 discloses a hydrostatic drive system that is operated in permanent four-wheel drive. A method is also disclosed, which minimizes wheel lock under braking (ABS). It is disadvantageous that it is not possible to switch over from four-wheel drive to two-wheel drive and that no anti-slip regulation (ASR) is provided in driving operation.

DE 42 11 323 discloses a hydrostatic drive system and a method for automatically switching over from four-wheel drive to two-wheel drive. The switchover is implemented in this case according to the driving speed. A disadvantage of this is that no anti-slip regulation (ASR) is provided in driving operation.

DE 10 2007 018 449 A1 discloses a permanent hydrostatic four-wheel drive with ASR. A disadvantage of the proposed solution is the lack of switchover between four-wheel drive and two-wheel drive. If slip occurs at a wheel, a control device reduces both a capacity of the respective hydraulic motor and a capacity of the other hydraulic motors. A disadvantage of this is that the overall driving torque is reduced and that there may be a threat of standstill of the vehicle and hindered breakaway after the standstill.

EP 1582 389 B1 discloses a hydrostatic drive system of a working vehicle with ASR, with which it is possible to switch over between all-wheel drive and two-wheel drive. A disadvantage in this case is that switchover only takes place as required if the driving conditions are monitored continuously by an experienced operator, which is correspondingly costly. As a result, it is likely that the operator will engage four-wheel drive permanently, which is less effective compared to two-wheel drive. In the case of ASR, a control device initially reduces a capacity of a hydraulic motor driving the wheel concerned or the axle unit concerned before accordingly increasing the capacity of the hydraulic motors assigned to the wheels not experiencing slip so as to equalize the volume flow rate balance and to achieve the overall driving torque. A disadvantage of this is that the first response causes the overall driving torque to be reduced initially, which may be associated with a standstill of the vehicle and hindered breakaway after the standstill.

DE 43 96 170 B4 discloses a four-wheel drive for a dump truck comprising a mechanically driven axle unit and a hydraulically driven axle unit. The drive is provided initially via the mechanically driven axle unit. In the event of slip at the wheels of the mechanical axle unit, the hydraulically driven axle unit is activated. A disadvantage of this solution is that two different drive concepts have to be operated matched to one another, which constitutes increased technical complexity of the apparatus.

A disadvantage of the suggested drive systems and of the suggested methods is that an overall driving torque of the drive system is initially reduced when slip occurs.

By contrast, the object of the disclosure is to create a hydrostatic drive system having improved traction when slip occurs and improved efficacy.

This object is achieved by a hydrostatic drive system having the features described below and by a method for the anti-slip regulation of a hydrostatic drive system having the features described below.

Advantageous developments of the disclosure are disclosed in the below description.

SUMMARY

In accordance with the disclosure, the hydrostatic drive system has at least one hydraulic pump, via which at least two hydraulic motors are supplied with pressure medium. Each axle unit or a wheel of the axle unit can be driven by a respective one of the hydraulic motors. At a first axle unit a device detects slip of a wheel of the axle unit. At least one hydraulic motor of the other axle unit or of a wheel of the other axle unit can be activated automatically by a control device in accordance with the slip. Activation in accordance with the disclosure of at least one hydraulic motor of the other axle unit or of the wheel of the other axle unit leads to more traction and to an additional driving torque of wheels that until then were not driven and thus prevents a fall in the overall driving torque in spite of the slip, which prevents slowing or stopping of the vehicle. In addition, the slip may be remedied due to the activation alone and without engagement of the wheel experiencing slip. Furthermore, this activation may be an automatic switchover between a two-wheel drive and a multi-wheel drive, for example a four-wheel drive, which avoids defective random engagement by an operator, and therefore the propulsive force and possibly the operational reliability of the vehicle is improved. Furthermore, this leads to an increased use of the two-wheel drive and therefore to optimized use of the drive system in terms of efficacy.

To be able to effectively control the driving torque of the at least one activated hydraulic motor of the other axle unit or of the wheel of the other axle unit via the control device, the hydraulic motor is a servomotor in an advantageous development. This motor can be adjusted via the control device toward greater capacity when slip is detected at the first axle unit or at the wheel of the first axle unit, which, in addition to the above-described activation, makes it possible to activate the driving torque of the hydraulic motor in a metered manner.

In a development of the drive system according to the disclosure in which the apparatus is technically simple, the at least one hydraulic motor of the other axle unit or of the wheel of the other axle unit is deactivated via the control device in a driving situation in which no slip occurs at the first axle unit or at the wheel of the first axle unit. Two-wheel drive, which is more effective than four-wheel drive, is thus activated.

In an advantageous development of the drive system according to the disclosure, the at least one hydraulic motor of the other axle unit or of the wheel of the other axle unit is a servomotor and can thus be adjusted via the control device toward lower capacity or driving torque in a driving situation in which no slip occurs at the first axle unit. A stable equilibrium with optimal distribution of traction and wheel driving torques can thus be set between the respective axle units or wheels of the axle units according to the traction or ground conditions.

For the slip detection, the device has at least one pressure sensor, which is arranged in, or on, a high-pressure line of the drive system. In addition, it is advantageous if the device has at least one rotational-speed sensor, via which a rotational speed of an axle unit, a wheel or a hydraulic motor can be determined.

In a preferred development, the at least one hydraulic motor of the first axle unit or of the wheel of the first axle unit is a servomotor and can be adjusted via the control device. This has the advantage that, if the activation or actuation of the at least one hydraulic motor of the other axle unit or of the wheel of the other axle unit has not remedied the slip at the wheel of the first axle unit, the driving torque of the hydraulic motor of the first axle unit or of the wheel of the first axle unit can be reduced toward a lower capacity by adjusting said motor, and the slip situation can thus be terminated. In contrast to different pivoting dynamics with the pure pump compensation known from the prior art, a dynamic of the motor adjustment is in this case equal with the hydraulic motors and there is no potential dynamic excess or potential dynamic shortfall of oil.

In order to remedy slip in a case in which neither the activation or actuation of the at least one hydraulic motor of the other axle unit or of the wheel of the other axle unit, nor the adjustment of the hydraulic motor of the first axle unit or of the wheel of the first axle unit toward a lower capacity has remedied the slip, the at least one hydraulic pump of the drive system is advantageously a variable displacement pump and is adjustable toward a lower displacement via the control device.

To increase the operational reliability and so as to allow the operator to change for example between two-wheel drive and four-wheel drive, even in the event of a failure of the control device, the automatic activation or adjustment, controlled via the control device, of the at least one hydraulic motor of the other axle unit or of the wheel of the other axle unit can be activated and deactivated manually via an operating unit.

In accordance with the disclosure, a method for the anti-slip regulation of a hydrostatic drive comprising at least one hydraulic pump, via which at least two hydraulic motors connected in parallel can be supplied with a pressure medium, wherein a first axle unit or a wheel of the first axle unit is driven via a hydraulic motor of the first axle unit or of the wheel of the first axle unit, and wherein another axle unit or a wheel of the other axle unit can be driven via a hydraulic motor of the other axle unit or of the wheel of the other axle unit, has the step of "activating the at least one hydraulic motor of the other axle unit or of the wheel of the other axle unit via a control device in accordance with the slip", once the slip has been detected at a wheel of the first axle unit. The activation according to the disclosure of the hydraulic motor leads immediately to more traction and to an additional driving torque of wheels that until then were not driven, and thus prevents a fall in the overall driving torque in spite of the slip, which prevents slowing or stopping of the vehicle. In addition, by reducing the pressure at the hydraulic pump, the slip may be remedied due to the activation alone and without engagement of the first axle unit or of a wheel of the first axle unit. Furthermore, the activation via the control device is automated, which avoids defective random engagement by an operator, and therefore the operational reliability of the vehicle is improved. A special case of the activation according to the disclosure is the activation of a second axle unit relative to the first axle unit, already driven, of a four-wheel drive. Furthermore, the activation leads to an increased use of two-wheel drive and therefore to optimized use of the drive system in terms of efficacy.

A slip situation is preferably detected by determining a pressure in a high-pressure line of the drive system by means of a pressure sensor. Alternatively or in addition, a rotational speed of the hydraulic motors or of the axle units or of the wheels may be determined by means of a rotational-speed sensor. Detected values of pressure and rotational speed are forwarded to the control device and are evaluated thereby to establish a slip situation. It is characteristic of a slip situation that the pressure oscillates relatively severely. In addition the pressure level, which is necessarily averaged, of the pressure oscillations is lower than before the slip situation. The pressure level before slip is a measure for the traction of the drive system necessary before slip, and the pressure level averaged over a suitable period when slip begins is a measure for the remaining traction of the at least one wheel experiencing slip. The control device can easily establish which wheel is experiencing slip from the data of the rotational-speed sensor. Wheels that are not driven are a suitable indicator of a rotational speed reference of wheels not experiencing slip.

The pressure level measured in the occurring slip situation is particularly advantageously used for preliminary control of the hydraulic motors. If the pressure difference between the pressure level before the slip situation and the averaged pressure level when slip begins is too large, the driving torque of the wheel experiencing slip can already be reduced preventatively for subsequent driving situations.

If the slip situation is not terminated in spite of the activation of the at least one hydraulic motor of the other axle unit or of the wheel of the other axle unit, it is advantageous if a capacity of the at least one activated hydraulic motor is increased in accordance with the slip, for example by increasing a pivoting angle. A precondition for this is that the hydraulic motor is formed as a servomotor. The overall driving torque of the drive system advantageously continues to rise by means of the increase in the capacity. Under the precondition of a constant displacement of the hydraulic pump, the driving torque falls at the wheel experiencing slip, which may lead to termination of the slip situation.

In particular if the slip situation continues to exist in spite of the activation according to the disclosure, the capacity of the hydraulic motor of the first axle unit or of the wheel of the first axle unit may be reduced via the control device, if said hydraulic motor is adjustable, in addition to one of the previous steps. Under the precondition that the hydraulic pump is adjustable, the displacement of said pump may also be reduced by the control device so as to terminate the slip situation.

If there is no slip at a wheel of the first axle unit, the at least one hydraulic motor of the other axle unit or of the wheel of the other axle unit can be deactivated via the control device, or the capacity of this hydraulic motor can be reduced via the control device, so as to either switch over from multi-wheel drive to two-wheel drive or achieve an optimal distribution of the driving torques or the traction between the axle units and optimize the efficacy of the multi-wheel drive.

BRIEF DESCRIPTION OF THE DRAWINGS

A single exemplary embodiment of the disclosure will be explained in greater detail hereinafter on the basis of a schematic drawing.

DETAILED DESCRIPTION

The FIGURE shows a schematic illustration of a first and only exemplary embodiment of a hydrostatic drive system 1 according to the disclosure of a harvesting machine. A diesel engine 2 is coupled to an adjustable hydraulic motor, which is formed as an axial piston pump 4 of swash plate design, and drives said motor. The axial piston pump 4 can be pivoted to change a direction of displacement and therefore a driving direction. A first axle unit, in this case the front axle unit 6, of the drive system 1 has two front wheels 8. The front wheels 8 are coupled via a differential transmission 10 to an adjustable hydraulic motor, which is formed as an axial piston motor 12 of swash plate design, and are driven thereby. Another axle unit, in this case the rear axle unit 14, has two rear wheels 16. In the case of the rear axle unit 14, the two rear wheels 16 are each driven directly via an assigned adjustable hydraulic motor, which is formed as an axial piston motor 18 of swash plate design.

The axial piston pump 4 is connected via a high-pressure line 20 and a low-pressure line 22 in a closed hydraulic circuit to the three axial piston motors 12, 18 connected in parallel.

The drive system 1 has a control device 24 for automatically switching over between two-wheel drive and four-wheel drive and for controlling the states of the four-wheel drive. Furthermore, it has a manual operating unit 26 for activating/deactivating the automatic switchover and control according to the disclosure and a diagnosis unit 28. A further manual operating unit 30 for changing driving direction is connected to the axial piston pump 4. Tachometers 32 are connected via signal lines 34 to the control device 24. The control device 24 is connected via signal lines 36 to servomotors of the swash plate of the axial piston motors 12, 18. A cable harness 38 of the control device 24 bundles the signal lines 34, 36.

During normal, light driving operation, the two-wheel drive is active. Only the front axle unit 6 is driven. The diesel engine 2 runs at constant rotational speed in this case, and therefore the axial piston pump 4 driven thereby rotates concurrently at constant rotational speed and conveys a constant flow of pressure medium into the high-pressure line 20. It thus drives the axial piston motor 12 of the front axle unit 6. Its capacity is set in this case by a pivoting angle at its swash plate and results in a driving torque at the front axle unit 6. Pressure medium flows to the axial piston motors 18 of the rear axle unit 14 via a branch of the high-pressure line 20. The pivoting angle of said axial piston motors is zero, and therefore the rear wheels 16 roll along passively during the driving motion. This state, or a state, in which the pivoting angle of the axial piston motors 18 of the rear axle unit 14 is set so small that the wheels 16 and the axial piston motors 18 overcome their inherent inhibition for example is known as two-wheel drive. Since the rear wheels 16 therefore have no driving torque or almost no driving torque, they cannot spin or slip. They are therefore very good for steering the harvesting machine and for detecting the driving speed.

If the overall traction in heavy working conditions is no longer sufficient, the driven front wheels 8 spin. At this moment, or at an earlier moment, the operator has two options: Either he switches over manually via an operating unit (not shown) from two-wheel drive to four-wheel drive, or he preferably activates via the operating unit 26 a switchover between two-wheel drive and four-wheel drive controlled in an automated manner according to the disclosure.

The starting situation to describe the automated switchover according to the disclosure between two-wheel drive and four-wheel drive and the response to the ASR situation is travel in two-wheel operation and an automated switchover activated via the operating unit 26.

In accordance with the disclosure the pressure or pressure level in the high-pressure line 20 of the drive system 1 is detected permanently via a pressure sensor (not shown) and is forwarded via a signal line (not shown) to the control device 24. This calculates or computes the pressure level and the averaged pressure level before a slip situation.

If a slip situation then occurs at the wheels 8 of the driven front axle unit 6, this can be identified from severe oscillations of the pressure, wherein the averaged pressure level of the oscillations is lower than before slip, that is to say before occurrence of the oscillations. The pressure level before slip is a measure in this case for the traction of the drive system 1 necessary until just before slip. The averaged pressure level once slip has occurred, that is to say a value of the oscillating pressure averaged over a suitable period, is a measure for the remaining traction of the at least one wheel 8 experiencing slip, since the pressure is always determined by the wheel 8 having the lowest traction. The control device 24 can easily determine which wheel 8 is spinning from a deviating rotational speed of a wheel 8 calculated via a rotational-speed sensor 32. Since the rear wheels 16 are not driven in this instance and consequently cannot slip, their rotational speed can be used effectively as a reference rotational speed of wheels not experiencing slip. This calculation strategy is more accurate than a strategy with which a reference rotational speed is obtained by averaging the rotational speeds of all wheels 8, 16, since the calculation does not include any wheels already experiencing slip. Of course, a wheel circumference of all involved wheels 8, 16 is taken into account by the control device during this process.

The pressure difference between the pressure level before slip and the averaged pressure level after the occurrence of slip is therefore also a measure for the remaining traction and is an important input quantity of the control device so as to respond to the ASR situation.

The first step according to the disclosure of the control device 24 in response to the slip situation is to increase the driving torque at the rear wheels 16 of the rear axle unit 14, which until then were not driven, which corresponds to an automated activation of the wheels 16 or an automated switchover from two-wheel drive to four-wheel drive. At the same time, this means that the capacity of the axial piston motors 18 is increased in jumps. In principle, the delivery rate of the axial piston pump 4 can be compensated in this case via the control device 24. If compensation does not occur, more capacities in the hydraulic motors 12, 18 are provided on the whole and the pressure in the high-pressure line 20 falls with continued constant delivery rate of the axial piston pump 4. Since the driving torque of an axial piston motor 12 depends on the pressure difference between its inlet 20 and outlet 22, the driving torque of the wheel 8 experiencing slip is thus also reduced. If the driving torque of the wheel 8 falls below a critical value corresponding to the ground or friction conditions as a result of this measure, the slip at the wheel 8 is thus remedied and the traction of the wheel 8 is reinstated. Merely by the activation of the rear wheels 16 is it thus possible to overcome the slip situation at the front axle unit 6.

In principle, this first step when slip occurs constitutes a reverse of the known ASR strategies of the prior art, which first and foremost respond to a slip situation with a reduction of the driving torque or capacity of the hydraulic motor driving the wheel 8 experiencing slip and therefore initially reduce the overall driving torque of the vehicle. These known ASR strategies increase the risk that the vehicle comes to a stop and the traction for breakaway with ground conditions that are already difficult is no longer sufficient. An increase according to the disclosure of the driving torque of the driven wheels 8 is then only possible if this degree of freedom is also effectively provided and not all capacities are already set to maximum values, which is generally the case in the prior art with pre-set four-wheel drive. The advantage of the automatic switchover according to the disclosure from two-wheel drive to four-wheel drive is particularly clear in this regard. In another exemplary application, a conventional reduction of the capacity of the driven hydraulic motor is not even possible, since the motor is a fixed displacement motor. This concerns harvesting machines operated in two-wheel drive for example, in which a driven axle unit is driven by a fixed displacement motor. In this case, the ASR strategy of activation according to the disclosure provides the driven axle unit with a first step for remedying the slip situation.

If the slip situation exists in spite of the disclosed activation, which is also identified by the control device 24 on the basis of the above-described pressure profile and the rotational speed conditions, the capacities or the pivoting angles of the axial piston motors 18 of the wheels 16 of the rear axle unit 14 can be further increased. All changes to the capacities of the aforementioned axial piston motors 12, 18 preferably occur under consideration of a requirement that the overall driving torque of the drive system 1, or the speed of the vehicle, can be kept constant. If a constant delivery rate of the axial piston pump 4 is presupposed, this means that the capacity of the axial piston motor 12 of the front axle unit 6 has to be reduced accordingly via the control device 24 in the event of a disclosed increase of the capacity of the axial piston motors 18 of the wheels 16 of the rear axle unit 14. Alternatively, the increase of the capacities of the axial piston motors 18 via the control device 24 may also be used to increase the overall driving torque, and an associated increased volume flow rate demand by the axial piston pumps 4 can be compensated.

If the slip situation has not been remedied by the above-disclosed steps of automated activation of the rear wheels 16 and the additional increase in the capacity of the axial piston motors 18 driving said wheels, the slip situation can be responded to in the conventional manner by reducing the driving torque of the axial piston motor 12 by reducing the capacity thereof. This procedure may take place advantageously at the same time as the increase of the capacities of the axial piston motors 18. Similarly, there is also the option to remedy the slip by reducing the delivery rate of the axial piston pump 4 either by decreasing the rotational speed of the diesel engine 2 or by reducing the pivoting angle thereof.

Once the slip situation at the front axle 6 has been remedied, the pivoting angles of the axial piston motors 18 of the wheels 16 of the rear axle unit 14, and therefore the capacities thereof, can be reset to low values via the control device 24 in a suitable ramp function. An optimal traction distribution between the wheels 8 of the front axle unit 6 and the wheels 16 of the rear axle unit 14 can thus be achieved with the aid of the control device 24. If the conditions are favorable, it is also possible to switch back fully and automatically into two-wheel drive.

The hydrostatic drive system 1 according to the disclosure and the method according to the disclosure are not restricted to the shown exemplary embodiment of the drive system. It is thus true for each axle unit of the drive system that the wheels can be driven either individually via a wheel hydraulic motor or jointly via an axle hydraulic motor. The hydraulic motors may be formed as fixed displacement motors or as servomotors in this instance. The drive system may also have more than two, for example three, four, five or six, axle units. The drive system according to the disclosure may also have two or three wheels or a multiple of the number of the above-mentioned axle units. The drive system according to the disclosure may also be used in vehicles that are not driven by the principle of wheel traction, but by the principle of chain traction, that is to say in vehicles that have a chain drive.

The hydrostatic drive system according to the disclosure may have a reversal of direction of rotation.

The number of hydraulic pumps used in the hydrostatic drive system according to the disclosure may be greater than one. For example, a tandem pump may thus be used. If the vehicle is driven in two-wheel operation, the reduced oil demand resulting from the low capacity of the hydraulic motors can be utilized to actuate just one pump and to leave the second pump in the neutral position. This raises the efficacy of the drive system.

A hydrostatic drive system is disclosed, comprising an anti-slip regulation unit having at least one hydraulic pump, via which a plurality of hydraulic motors of a plurality of axles can be supplied with pressure medium. In accordance with a detected slip, it is possible to switch over automatically between a two-wheel drive or multi-wheel drive and the driving torques can be regulated. With the drive system according to the disclosure, an optimal distribution of the driving torques and of the traction between the axles or wheels of the drive system can thus be set.

A method is also disclosed for the anti-slip regulation of a hydrostatic drive, which responds to a slip situation in a first step by activating a hydraulic motor of axles or wheels that until then were not driven or were only driven with low driving torque, or by increasing the driving torques of wheels that until then did not slip, wherein the activation or the increase is implemented by raising a capacity of the hydraulic motor of the axles or wheels.

The invention claimed is:

1. A hydrostatic drive system comprising:
   at least one hydraulic pump configured to supply at least two hydraulic motors with pressure medium;
   at least one axle unit or a respective wheel of the at least one axle unit configured to be driven via a respective one of the hydraulic motors;
   a device configured to detect a slip of a wheel of a first axle unit; and
   a control device configured to activate at least one respective hydraulic motor of a second axle unit or of a wheel of the second axle unit in accordance with the slip.

2. The hydrostatic drive system as claimed in claim 1, wherein the at least one respective hydraulic motor of the second axle unit or of the wheel of the second axle unit is configured to be adjusted via the control device toward greater capacity when slip is detected.

3. The hydrostatic drive system as claimed in claim 2, wherein the at least one respective hydraulic motor of the second axle unit or of the wheel of the second axle unit is configured to be adjusted via the control device toward lower capacity in a driving situation without slip.

4. The hydrostatic drive system as claimed in claim 1, wherein the at least one respective hydraulic motor of the second axle unit or of the wheel of the second axle unit is deactivated via the control device in a driving situation without slip.

5. The hydrostatic drive system as claimed in claim 1, wherein the device configured to detect the slip includes one of:
   at least one pressure sensor, which is arranged in, or on, a high-pressure line; and
   at least one rotational-speed sensor configured to determine a rotational speed of the hydraulic motors or of the axle units or of the wheels.

6. The hydrostatic drive system as claimed in claim 1, wherein at least one respective hydraulic motor of the first axle unit or of the wheel of the first axle unit is configured to be adjusted via the control device.

7. The hydrostatic drive system as claimed in claim 1, wherein the at least one hydraulic pump is configured to be adjusted via the control device.

8. The hydrostatic drive system as claimed in claim 1, further comprising:
   an operating unit configured to activate or deactivate activation or adjustment, controlled automatically via the control device of the at least one respective hydraulic motor of the second axle unit or of the wheel of the second axle unit.

9. A method for anti-slip regulation of a hydrostatic drive system comprising:
   supplying at least two hydraulic motors connected in parallel with a pressure medium using at least one hydraulic pump;
   driving a first axle unit or a wheel of the first axle unit with at least one hydraulic motor of the first axle unit;
   driving a second axle unit or a wheel of the second axle unit with at least one hydraulic motor of the second axle unit;
   detecting a slip of a wheel of the first axle unit; and
   activating the at least one hydraulic motor of the second axle unit or of the wheel of the second axle unit in accordance with the slip using a control device.

10. The method for anti-slip regulation of the hydrostatic drive system as claimed in claim 9, wherein:
    detecting the slip includes at least one of:
      determining a pressure in a high-pressure line with a pressure sensor; and
      determining a rotational speed of the hydraulic motors or of the wheels with a rotational-speed sensor; and
    determined pressure and rotational speed values are forwarded to the control device.

11. The method for anti-slip regulation of the hydrostatic drive system as claimed in claim 9, further comprising increasing a capacity of the at least one hydraulic motor of the second axle unit or of the wheel of the second axle unit using the control device in accordance with the slip.

12. The method for anti-slip regulation of the hydrostatic drive system as claimed in claim 9, further comprising reducing the capacity of the at least one hydraulic motor of the first axle unit or of the wheel of the first axle unit using the control device in accordance with the slip.

13. The method for anti-slip regulation of a hydrostatic drive system as claimed in claim 12, further comprising reducing a delivery rate of the at least one hydraulic pump using the control device.

14. The method for anti-slip regulation of a hydrostatic drive system as claimed in claim 9, further comprising deactivating the at least one hydraulic motor of the second axle unit or of the wheel of the second axle unit or reducing the capacity of the at least one hydraulic motor of the second axle unit or of the wheel of the second axle unit once the slip has been remedied using the control device.

* * * * *